(12) United States Patent
Curulli et al.

(10) Patent No.: US 9,149,059 B2
(45) Date of Patent: Oct. 6, 2015

(54) FOODSTUFF PROCESSING

(75) Inventors: Franca Curulli, Avondale Heights (AU);
Mario Klingler, Hampton (AU);
Raymond Frank Mawson, Waurn Ponds (AU); Prayouth Suwanchewakorn, Cheltenham (AU)

(73) Assignee: Simplot Australia Pty Limited, Mentone (AU)

( * ) Notice: Subject to any disclaimer, the term of this patent is extended or adjusted under 35 U.S.C. 154(b) by 2212 days.

(21) Appl. No.: 11/992,349

(22) PCT Filed: Sep. 20, 2006

(86) PCT No.: PCT/AU2006/001377
§ 371 (c)(1),
(2), (4) Date: Mar. 20, 2008

(87) PCT Pub. No.: WO2007/033416
PCT Pub. Date: Mar. 29, 2007

(65) Prior Publication Data
US 2009/0087524 A1    Apr. 2, 2009

(30) Foreign Application Priority Data

Sep. 23, 2005  (AU) ............................... 2005905240
Jun. 22, 2006  (AU) ............................... 2006903374

(51) Int. Cl.
*A21D 6/00*   (2006.01)
*A23C 3/00*   (2006.01)
(Continued)

(52) U.S. Cl.
CPC ............. *A23L 1/0252* (2013.01); *A23L 1/0107* (2013.01); *A23L 1/0121* (2013.01); *A23L 1/0128* (2013.01); *A23L 1/2163* (2013.01)

(58) Field of Classification Search
CPC ... A23L 1/0252; A23L 1/0107; A23L 1/0121; A23L 1/0128; A23L 1/2163
USPC .................................. 426/238, 661, 637, 438
See application file for complete search history.

(56) References Cited

U.S. PATENT DOCUMENTS 4,353,928 A * 10/1982 Seliger et al. ................ 426/238
5,113,881 A    5/1992 Lin et al.
(Continued)

FOREIGN PATENT DOCUMENTS

DE    10 2004 011 922      9/2005
EP          339112 B1  *   6/1992
(Continued)

OTHER PUBLICATIONS

Double Fried French Fries (Feb. 1, 2001) available at www.jfolse.com/recipes/vegetables/sidedish41.htm.*
(Continued)

*Primary Examiner* — Rena L Dye
*Assistant Examiner* — Assaf Zilbering
(74) *Attorney, Agent, or Firm* — Wolf, Greenfield & Sacks, P.C.

(57) ABSTRACT

A method of processing food elements of plant tissue having a cellular structure with substantial starch content comprising arranging the food elements in an aqueous liquid and applying acoustic energy with a selected frequency energy and time profile to modify the cellular structure of a surface portion of the food elements by removing components from the cellular structure and establishing a pectin based surface portion surrounding a core portion and adapted to act as a barrier in a high temperature subsequent cooking process, the modified cellular structure providing for a relatively low moisture surface portion to be established and maintained and moisture to be substantially retained in the core portion after subsequent cooking processes.

27 Claims, 2 Drawing Sheets

(51) Int. Cl.
  *A23L 3/32* (2006.01)
  *A23L 1/025* (2006.01)
  *A23L 3/30* (2006.01)
  *A23L 3/00* (2006.01)
  *A23L 1/05* (2006.01)
  *A23L 1/216* (2006.01)
  *A23L 1/01* (2006.01)

(56) References Cited

U.S. PATENT DOCUMENTS

| | | | |
|---|---|---|---|
| 5,498,431 A | 3/1996 | Lindner | |
| 2002/0004085 A1* | 1/2002 | Xu et al. | 426/52 |

FOREIGN PATENT DOCUMENTS

| | | |
|---|---|---|
| JP | 2003-319874 | 11/2003 |
| SU | 1479053 | 5/1989 |
| WO | WO 2006/103671 | 10/2006 |

OTHER PUBLICATIONS

Mayer et al., "Potato pulp: microbiological characterization, physical modification and application of this agricultural waste product", Appl. Microbiol Biotechnol 48 : 535-440(1997)).*

Tattiyakul et al., "Novel Food Processing: Effects on Rheological and Functional Properties: Chapter12 Effect of High-Pressure and Ultrasonic Processing of Foods on Rheological Properties" (2009).*

Wang et al., "Recent Advances in Extractino of Nutraceuyticals from Plants". Trends in Food Science & Technology vol. 17, pp. 300-312 (2006).*

Examination Report of the European Patent Office for European Application No. EP 06 775 004.2 (4 pages).

International Preliminary Report on Patentability for International Application No. PCT/AU2006/001377, dated Mar. 26, 2008 (6 pages).

Mason et al., The uses of ultrasound in food technology, Ultrasonics Sonochemistry, 1996, S253-S260, 3, Elsevier Science B.V.

* cited by examiner

FOODSTUFF PROCESSING

FIELD OF THE INVENTION

The present invention relates to processed foodstuffs and more particularly is concerned with high starch plant tissue (typically greater than 5% starch) that are processed before marketing and/or presentation for consumers for consumption (either as whole tuber vegetable and plant tissue including various cuts and sizes). The present invention manifests itself in various forms including processed foodstuffs and novel methods and apparatus for processing foodstuffs. In this specification, "high" starch means a starch level which is substantial (typically >5% w/w) and wherein the starch level is such that significant response occurs during processing. For example, potatoes have high starch, typically being about 80% of the solid (which comprises about 20% of the potato mass).

In this specification, by way of exemplification only, the invention will be described with reference to embodiments applicable to the processing of starch-based foodstuffs such as potatoes but it will be appreciated the invention is not necessarily so restricted and the novel approaches described herein may be more widely applicable.

BACKGROUND OF THE INVENTION

Partially processed or fully processed food products are derived from various raw foodstuffs and customers, including domestic consumers and restaurants, welcome the provision of such processed food in a form which can be quickly readied for presentation to the ultimate consumer, often with a brief heating or food processing step. For example, outlets wishing to serve french-fries can have the convenience of purchasing bulk packs of frozen vegetable which can be brought to a predictable and attractive form by a brief period of cooking either with a deep frying technique or an oven technique.

Thus, there is a major demand in the market of many countries for products such as french-fried potato chips produced by cutting the potatoes into elongate square cross-sectional chips which are deep fried to produce chips to produce an appetising hot product. The product desirably has an attractive coloured exterior with a crunchy shell and a soft mealy interior. Thus, there is a major market for frozen, partially pre-fried potato chips (known as par-fried potatoes), and this approach simplifies storage and inventory control to outlets while assuring uniform quality between batches. Time and delay at an outlet and avoiding what would otherwise be considerable labour costs in processing french-fries from raw potatoes is achieved.

A typical process for producing a 10 mm frozen french-fry is as follows:

(a) Potatoes are firstly washed and then sometimes graded for quality and size for different product runs.
(b) The potatoes are peeled typically by a steam process with steam at high pressure and high temperature of around 200° C. for around 14 seconds.
(c) The potatoes are cut into elongate strips e.g. square cross-section of around 10 mm sides, conveniently in a water knife cutting or similar process.
(d) The potato strips are further processed to remove the defective strips and eyes, and then washed.
(e) Potato strips are blanched in a hot water process with this step reducing excess free sugars from the surface of the strips and to transform enzymes so as to be inactive. Sometimes the blanch is in two stages, namely a high temperature strep of around 83° C. for a few minutes followed a low temperature step typically around 73° C. for often a longer period.
(f) A drying process is effected to reduce the water content of the blanched strips. A weight loss of around 12% typically occurs where the drying process is around 60° C.
(g) Par-frying of the potato chips is effected in hot oil at around 190° C. for a suitable time of around 50 seconds.
(h) Lastly freezing is effected to freeze the potato chips down to a temperature of around −18° C. ready for packing, and for storage and distribution.

Frozen potato chips produced as described above typically will be suitable to be finish fried at a serving location in suitable oil at about 180° C. for around 3 minutes. It is recognised that such hot chips need to be produced at an outlet in batches, but the holding time post-frying is short and therefore smaller, more frequent batches of chips need to be prepared and in many instances chips are discarded because they have texturally decayed. Such hot chips are liable to become gradually limp when holding due to migration of moisture from the product interior to the surface.

Apart from a long-standing desirability where possible to provide for economic processing and possibly improving consumer appeal and satisfaction for final product, it is has also been long recognised there is significant absorption of cooking oils into starch products such as french-fries which are cooked by frying. Adverse health implications are well understood to exist with foods with relative high fat levels and, at least for french-fries, the well established processes have an inevitable high fat content in the final product.

Despite the characteristics of present food processing, the processing of starch foods such as potatoes into products such as french-fries has essentially remained an industry with little change over an extended period.

Broadly, the present invention is concerned with devising different processes for starch-based foods which offer the potential for distinct and useful changes to methods, apparatus and/or products in the food industry.

SUMMARY OF THE INVENTION

The present invention concerns food products, methods and apparatus which make use of processing particularly of the surface portion of a starch-based food element to permit development of a modified superficial cellular structure which will in subsequent steps permit consumer appealing characteristics to be developed in terms of at least texture and mouth feel while leaving interior portions substantially unaffected; the food elements are processed with selected acoustic radiation for a selected period of time to suit the particular application and preferred or optimum conditions are deduced from appropriate experimentation with particular types and grades of food material.

Embodiments of the invention are aimed at producing a modified superficial cellular structure which is composed of enriched cell wall components (pectin, hemicelluloses etc.) as opposed to one where hydrated starch is predominant.

The inventors have determined that selected ultrasonic acoustic radiation is especially effective and convenient particularly for potato products at a stage of food processing before any heat treatment occurs. Thus, in one aspect the invention consists in a method of processing substantially raw food elements of plant tissue having a relative high starch content comprising applying ultrasonic energy to the food elements prior to any elevated temperature cooking step.

However some embodiments may have product already at elevated temperatures (e.g. in the case of high temperature blanching).

The invention may be identified, in one aspect, in a method of processing food elements of plant tissue having a cellular structure with substantial starch content comprising arranging the food elements in an aqueous liquid and applying acoustic energy with a selected frequency, energy and time profile to modify the cellular structure of a surface portion of the food elements by removing components from the cellular structure and establishing a pectin-based surface portion surrounding a core portion and adapted to act as a barrier in a high temperature subsequent cooking process, the modified cellular structure providing for a relatively low moisture surface portion to be established and maintained and moisture to be substantially retained in the core portion after subsequent cooking processes.

The temperature of the product where receiving the acoustic energy may also be selected to provided preferred results.

In one form, the invention is found in a method of processing food elements of plant tissue having a cellular structure with substantial starch content comprising arranging the food elements in an aqueous medium (which may be water or water medium with dissolved solutes) and applying acoustic energy with a selected frequency, energy, temperature and time profile to modify a surface portion of the food elements by stimulating responses in the tissue resulting in one or more of demethylation of pectin, polymerisation of phenolic compounds, wax synthesis and starch hydrolysis and promoting intercellular cohesion on the surface structure.

Alternatively, the invention may be defined as being included in a method of processing substantially raw food elements of plant tissue having a relative high starch content comprising applying ultrasonic energy to the food elements typically prior to any elevated temperature cooking step to facilitate removal of free sugars, protein and starch from a surface portion of the food elements and concentration of cell wall polymers which develops a surface structure which functions to provide crust textural enhancement. This textural enhancement can allow modification of the frying process.

Yet a further form of the invention is in a method wherein the aqueous liquid is a water bath at a temperature in the range 5° C. to 120° C.

Embodiments of the invention can be applied to producing potato chips for forming french-fries, and wherein the essentially raw potato chips are subjected to ultrasound under suitable conditions. One set of suitable conditions is to apply ultrasonic energy in the range of about 100 Hz to 5 MHz, for example by having a high frequency component in the range 170 kHz to 5 MHz and a low frequency component in the range of 100 Hz to 270 kHz.

Processing with ultrasonic energy for the order of 10 seconds to about 30 minutes with the product at ambient temperature or elevated temperatures of up to 120° C. is generally suitable and optimum conditions can be devised for whole potatoes or particular dimensioned potato chips for particular overall processes and particular grades of potato.

In another aspect, the invention manifests itself in a specific process apparatus having features for implementing the novel methods described herein.

In a further aspect, the invention is a food product of starch-based plant tissue having a modified surface cellular structure which is pectin based and substantially devoid of free sugars, starch and protein and of the nature of a food element produced by a method in any of the forms described hereinbefore.

In food processing such as potato chip processing, a preliminary step in some processes is blanching. Starch constitutes about 80% of potato solid matter. Starch is synthesised biochemically and is stored in individual packets called granules which are located within the cell matrix. In the case of a potato, starch comprises amylose and amylopectin in a ratio of about 1-3. Starch is insoluble in water, but when heated to around 65° C. the starch granules imbibe water, and begin to swell causing changes in cell wall structure and shape. The internal cell structure is thus opened, cell separation occurs releasing trapped insulating gas and facilitating capillary water transport. Internal texture is thus developed with starch gelatinisation. Particularly for french-fries, potatoes require optimal blanching as problems arise from either over blanching or under blanching. It is desirable to produce a high quality mealy interior texture.

An appropriate regime should be adopted having regard to a relatively high temperature short time blanching (typically around 83° C.) providing good mealiness development but only low sugar leaching. Lower temperature and longer time blanching (typically around 73° C.) provide lower mealiness development but higher sugar leaching.

For products such as french-fries, ultimately the consumer wishes there to be even colour development or browning. It is observed that potato processing releases reducing sugars but if sugars are above an acceptable level for appropriate colour development in final cooking, too much browning and indeed uneven browning can occur and this is unacceptable to the consumer. It is pointed out that potatoes have variable sugar concentrations due to a range of factors including plant genetics, growing conditions and storage conditions. Blanching leaches such sugars and therefore blanching control is indicated for product quality.

Embodiments of the present invention propose integration of the new processing concepts with blanching particularly when the foodstuff is potato for french-fries. One option is to apply the ultrasonic energy after peeling and cutting potatoes into strips. The processing can be in an aqueous medium prior to the blanching step, but other embodiments including conducting the ultrasonic processing during blanching or even after blanching.

Embodiments include introducing ultrasonic energy during potato peeling e.g. by steam peeling and/or during potato slicing as well as the alternative of introducing ultrasonic energy during a pre-blanching treatment stage. Ultrasonic energy may be applied at any one or more of these stages.

Investigations by the present inventors, particularly with reference to french-fries, indicate that compared with conventional processes, with embodiments of the invention there is the potential to achieve some or all of the following:
  enhance the production of textural and functional properties of the potato products;
  yield product of greater textural crispness stability and hold-life post cooking, at high and ambient temperatures;
  provide textural enhancement which enables frying conditions to be modified to provide less oil pick-up without compromising texture when compared to a conventionally processed product;
  enhance recovery of potato by-products (starches);
  ability to omit par-frying, or shorten temperatures and/or times for such processing;
  ability to use alternative potato varieties, including those having lower solids content (<18.5%);
  a improved surface mass transfer with improved energy efficiencies;

simplified single temperature blanching process and reduction in overall blanching time;

improve textural quality of inferior quality potatoes (e.g. those having low turgor);

enhanced leaching of endogenous sugars; and reduction in breakage of semi-frozen and cooked french-fries prior to final reconstitution and consumption, respectively.

BRIEF DESCRIPTION OF THE DRAWINGS

A description of an embodiment of the present invention will now be given by reference to the accompanying drawings in which.

DETAILED DESCRIPTION OF THE DRAWINGS

Figure 1:
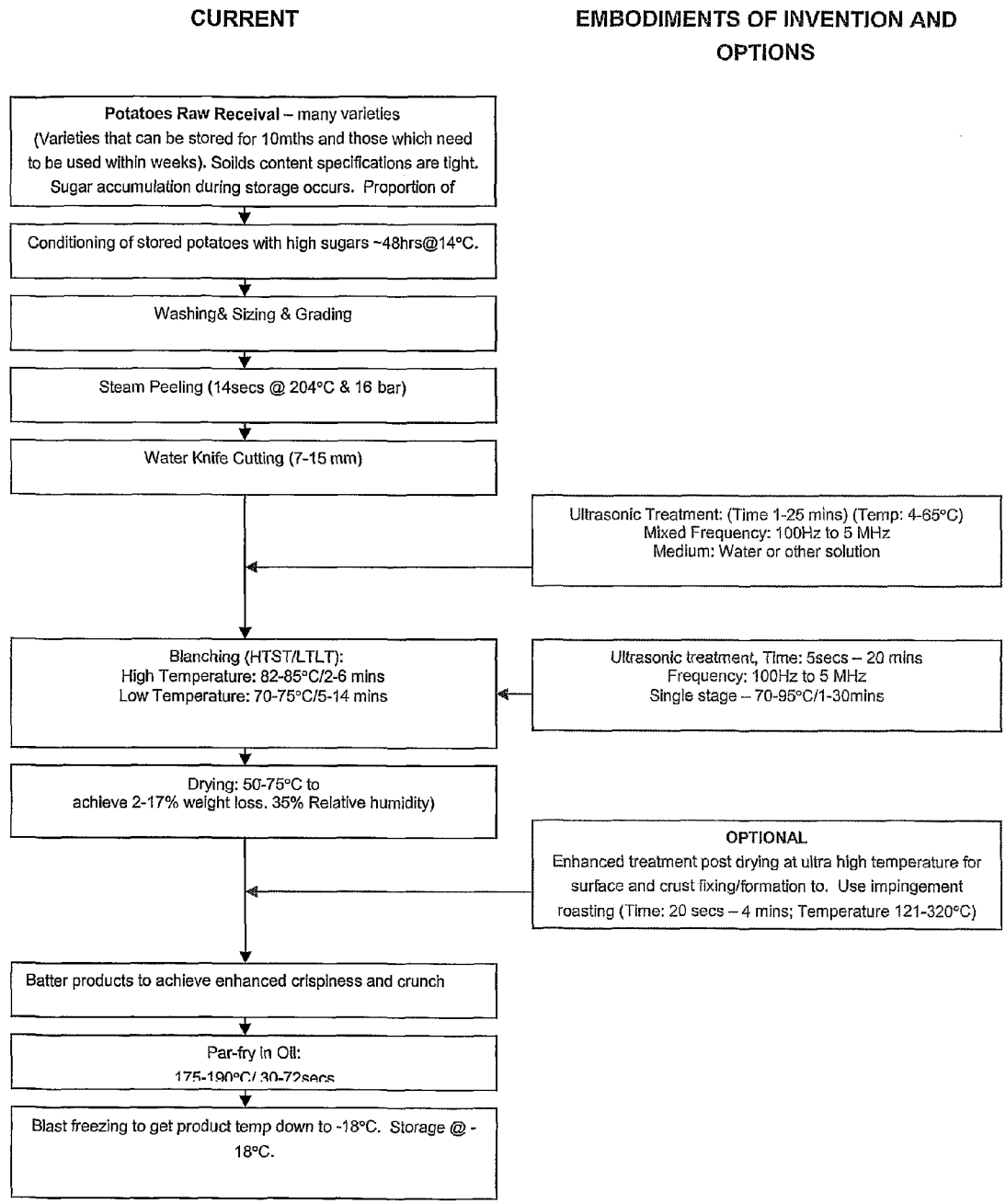
FIG. 1 illustrates an overview of a conventional french-fry production process to which is applied additional steps to form embodiments of the present invention.

FIG. 1 illustrates on the left hand side a conventional french-fry production process with, on the right hand side, an indication of modifications according to an embodiment of the invention.

Many varieties of potato may be used. Some may be stored for many months, but some may need to be used within weeks. Sugar accumulation occurs during storage. Conventionally, the stages are:

(i) conditioning potatoes at 14° C. for 48 hours;
(ii) washing, sizing and grading;
(iii) steam peeling for about 14 seconds at 204° C. and 16 bar;
(iv) water knife cutting into strips of 7-15 mm transverse dimensions;
(v) blanching either at 82-85° C. for 2-6 minutes, or 70-75° C. for 5-14 minutes;
(vi) drying at 50-75° C. to achieve 2-17% weight-loss to a relative solids level of 30%;
(vii) battering (an optional stage);
(viii) par-frying in oil for 30-72 seconds at 175-190° C.; and
(ix) fast freezing to −18° C. for storage at this temperature.

A further conventional optional stage is, after blanching, to engage in a dipping stage, typically by immersing potato strips in a dilute solution of dextrose to coat consistently potato pieces with sugar to achieve even colour and immersing in a solution of a sequestrant to prevent, after cooking, darkening and discolouration.

For a first embodiment, after water knife cutting ultrasonic treatment of the strips is effected for 1-25 minutes at 4° C. to 70° C. with mixed frequencies in the range of 100 Hz to 5 MHz, with the potato strips in water or another medium.

For a second embodiment, in the alternative or in addition, the ultrasonic treatment is for 5 seconds to 30 minutes in the blanching stage at 65-95° C. with mixed frequencies in the range of 100 Hz to 5 MHz.

For a third embodiment, an optional further step is used in addition after the drying stage, namely radiant and/or microwave heating at 120-350° C. for 20 seconds to 4 minutes for enhanced drying, surface fixing and crust formation.

Figure 2:
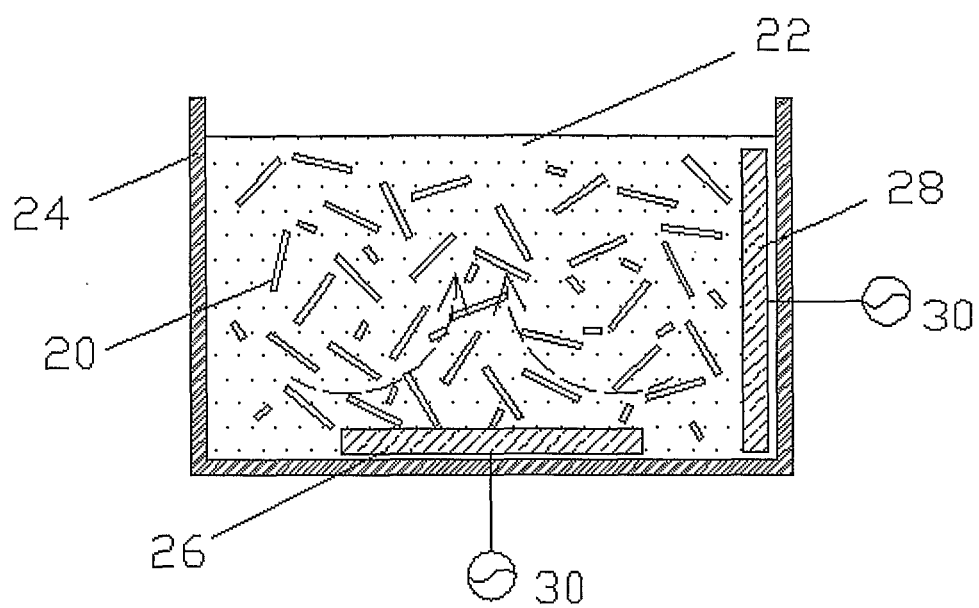
FIG. 2 schematically illustrates apparatus for carrying out the method of an embodiment of the present invention.

FIG. 2 illustrates schematically an embodiment of the invention at one step in the overall french-fry production process, wherein cut potato strips or chips 20 are advanced through a vessel containing water 22 as a transport medium within a vessel 24. Ultrasonic transducers 26 and 28 are disposed respectively adjacent the floor and side of the vessel 24 and are driven by a suitable ultrasonic sources 30A and 30B.

Operational conditions in one embodiment comprised driving one transducer at a frequency in the range 100 Hz to 5 MHz and the other at a higher frequency above 170 kHz. Power intensities in the range of 0.01 to 1000 Watts/cm$^2$ are indicated with processing temperatures for the foodstuff in the range of 4-65° C. (increase range to higher temps as above) and times in the range of 1 to 30 minutes. A suitable specific processing for potato chips of 10 mm side with a square cross-sectional shape is as follows when applied at a pre-blanching step:

transducer 28 driven at 1 MHz for a time of 10 minutes, at a power of 16.7 Watts/liter;

transducer 26 driven at 40 kHz for a time of 10 minutes, at a power of 53.3 Watts/liter;

water temperature 55° C.

However, it may be preferred to have transducer 28 driven at 400 KHz at a power of about 25 watts/liter.

In some embodiments an acoustic energy at around 400 kHz is applied at a power of about 25 watts per liter. In other embodiments, an acoustic energy at around 40 kHz is applied at a power of about 50 watts per liter. In some embodiments, acoustic energy is applied for a time period in the range of 10 seconds to 30 minutes at a frequency in the range of about 100 Hz to about 5 MHz and causes a response in the surface portion of the food elements comprising one or more of demethylation of pectin, polymerisation of phenolic compounds, wax synthesis and starch hydrolysis and promoting intercellular cohesion on the surface structure.

The process of FIG. 1 illustrates the ultrasonic treatment being applied before and/or during blanching, but the treatment may also be conducted after blanching. This treatment can be applied at one or more of these steps.

However, the application of ultrasonic energy during washing may also be considered to enhance the removal of foreign material from the surface of the potato and steam peeling may also be enhanced by selected ultrasonic treatment with the possibility of increasing the speed of the process and reducing potential heat damage and loss of material through surface sloughing. During the cutting stage, ultrasonic excitation also may be used to facilitate a cleaner cut with a less porous cut strip surface and an increased yield for the process.

To facilitate a possible explanation and understanding of the present invention, a disclosure of some theories will now be made but on the basis that this explanation is not presented as a binding explanation and neither is it presented as complete. It is suggested that the ultrasonic energisation has a surface effect including the stripping of starch, sugars and protein from the surface to leave a layer composed substantially of pectin and altered superficial cellular structure. It is believed that the result is to affect cell walls which are of a complex structure and to effect reactions between components of the cell walls and to alter their structural configuration. In particular, it is believed a strong, strengthened cell wall structure is achieved and there may be initiation of hydroxyl-radical driven reactions within the protein and phenolic compounds in the cell walls. This structure is thought especially to follow from particular embodiments utilising a mixture of ultrasonic frequencies.

For one embodiment of the invention, further ultrasonic treatment can be introduced during an elevated temperature blanching process. A wide range of treatment times are possible i.e. 1 to 30 minutes and a wide range of frequencies are possible i.e. 100 Hz to 5 MHz. Usually, french-fry production on an industrial scale requires two steps of blanching under different conditions, yet an embodiment of the present invention proposes a single stage of blanching at a temperature of 80-95° C. for a time of 1 to 30 minutes wherein ultrasonic energy is applied at a frequency in the range of 20 kHz to 1 MHz condition.

Processing conditions which avoid excessive production rates of internal water vapour within a potato chip are desirable so as to reduce the risk of gross surface rupture and consequently the development of large pores. Embodiments can include a new step of infra-red or microwave baking or combination thereof of potato chips after the drying step typically at a temperature in the range of 121-320° C. for a time of around 20 seconds to 4 minutes. This is believed to enhance the fixing of the surface of blanched potato strip.

Embodiments may lend themselves to advantageous changes to conventional steps of battering or spraying with oil and par-frying before a freezing process.

Embodiments of the invention may be especially beneficial when dealing with the challenge of processing high sugar potatoes. The presence of high sugars in potatoes may lead to unacceptable darkening of the colour in the final french-fry, unless there is appropriate processing. With high sugar potatoes it may be necessary to introduce aggressive leaching processes in order to remove sufficient sugar to achieve the desirable end product, for example, by extending the lower temperature blanching step. This may achieve the removal of excess sugars but may have a consequential undesirable deterioration of other characteristics including taste and texture.

Embodiments of the invention include applying ultrasound energy during a blanching stage in a manner to facilitate removal of sugars at an adequately fast rate to achieve desirable low sugar concentrations. It is thought that the ultrasound energy may increase mass transfer rate of sugars/polysaccharides from the surface and layers of the potato below the surface while permitting blanching to be kept as a simple and preferably single stage process with attendant economic advantages and achieving the desirable qualities in the resultant potato chip. More particularly, higher blanch temperatures than otherwise might be employed so that leaching can occur with desirable texture development and enzyme inactivation.

In general, embodiments of the invention offer the prospect of plant operator adjusting ultrasonic energy inputs at selected stages of the process to adjust to a wider spectrum of potato qualities and varieties to meet demanding customer specifications, particularly in frozen french-fries ready for final location frying.

Examples of processing conditions for embodiments of the invention will now be given.

EXAMPLE 1

Raw potatoes of the variety Russet Burbank were washed, peeled and cut into strips having a square cross-sectional shape of 10 mm width. The strips were immersed in a water bath at 25° C. and for 2 minutes were subjected to an ultrasound field with transducers operating receptively at 40 kHz and 1 MHz.

Thereafter the strips were blanched in a two-stage process comprising treatment for 4 minutes at 82.5° C. and for 10 minutes at 70° C.

The strips then underwent conventional drying in conditions of 65° C. and 40% relative humidity to achieve a weight-loss of 10-12%.

The dried strips were subsequently par-fried at 190° C. for 50 seconds followed by freezing at −18° C.

EXAMPLE 2

The process of Example 1 was repeated, but the ultrasound treatment was modified to be for 12 minutes.

EXAMPLE 3

The process of Example 1 was repeated, but the ultrasound treatment varied to be for 6 minutes and the temperature of the water bath was increased to 40° C.

EXAMPLE 4

The process of Example 1 was repeated, but with the ultrasound treatment extended to 10 minutes with the water bath at 55° C.

EXAMPLE 5

The process of Example 1 was repeated, but with the ultrasound treatment extended to 20 minutes at the water bath at 60° C.

EXAMPLE 6

The process of Example 1 was repeated, but with the ultrasound treatment extending for 11 minutes and the water bath treatment at 65° C.

EXAMPLE 7

The process of Example 1 was repeated, but with variations in the ultrasound by the respective transducers operating at 40 kHz and 380 kHz. Furthermore, the ultrasound treatment was extended for 9 minutes and the water bath at 75° C.

EXAMPLE 8

The process of Example 7 was repeated, but with the ultrasound treatment applied for 11 minutes and the water bath at a temperature of 55° C.

EXAMPLE 9

The process of Example 8 was repeated, but with the water bath temperature increased to 65° C.

EXAMPLE 10

The process of Example 3 was repeated, but the ultrasound was solely from a transducer operating at 40 kHz.

In a variation on this example, the process was repeated but with only high temperature short time blanching, namely 82.5° C. for 4 minutes.

EXAMPLE 11

The process of Example 10 was repeated, but in this case the ultrasonic treatment was from a single transducer operating at 1 MHz.

EXAMPLE 12

The process of Example 3 was repeated, but with the variation that the transducers operate at 40 kHz and 270 kHz respectively.

EXAMPLE 13

The process of Example 9 was repeated, but with the variation that the water bath temperature was at 60° C.

EXAMPLE 14

The process of Example 13 was repeated, but with the treatment time reduced to 11 minutes and the transducers replaced to operate at 80 kHz and 380 kHz respectively.

Overview of Results

An assessment of the french-fries produced by all the examples mentioned above showed a useful difference when compared with a product from conventional process and demonstrates a useful final product could be obtained through a variety of process conditions as exemplified above.

The choice of preferred conditions will depend upon a number of factors including equipment issues and the variety of the potatoes selected, the dimensions of the potato strips and applied power in the ultrasound processing. In the above examples the power applied, related to the volume of the processing bath and was in accordance with the embodiment described above namely, 16.7 Watts per liter for the transducer at 1 MHz and 53.3 Watts per liter for the transducer at 40 kHz. For examples using 380 kHz or 270 kHz, the power was respectively 53.3 Watts per liter and 53.3 Watts per liter. These powers can be varied as it has been demonstrated that the method is effective over a range of power frequencies.

All processed samples were analysed for fat and moisture composition using standard methods. Immediately after final frying, the texture of potato strips was determined using a Lloyd Texture measurement apparatus Model LRX Plus 5 kN. The instrument was fitted with a 5-blade Kamer shear cell. Specimens were compressed laterally to obtain force and deformation data.

The apparatus was also connected to a high sensitivity microphone to obtain an acoustic measurement wherein the sound was broken into frequency bands by fast fourier transform at selected frequency bands to obtain a measure of crispiness and crunchiness. The sensory properties of representative samples were also assessed using a Quantitative Descriptive Analysis technique with trained panellists. Panellists profiled samples for various organoleptic attributes e.g. colour and its uniformity, crispiness, crunchiness, toughness, oiliness, flavour and aroma. Correlation between instrumental texture analysis and sensory profiling results was high.

The chip surface polymer composition was determined using Fourier Transform Infrared (FTIR) spectroscopy.

The above analysis was conducted on representative samples in comparison to conventionally processed chips of the same variety and size, and a summary of results is set out below.

Sample A

The results of the process described in Example 4 resulted in a 55% increase in crunchiness and crispiness as determined by acoustics and formal sensory testing. FTIR analysis results indicated high cell wall pectin levels, low residual protein and virtually no surface starch and sugar. In contrast, the surface polymer composition of conventionally prepared French fries and potato strips demonstrated low levels of pectin, moderate residual protein and moderate starch and sugar.

Sample B

French fries produced according to Example 9 demonstrated a 50% increase in crunchiness and crispiness from acoustic tests and a 45% increase in crunchiness and crispiness from sensory testing. FTIR analysis indicated high levels of cell wall pectin, low residual protein and virtually no surface starch and sugar.

Sample C

French fries produced by the process described in Example 10 resulted in 35% increase in crunchiness and crispness as determined by acoustics and sensory tests and a moderate level of pectin, lower residual protein and virtually no surface starch and sugar when compared to conventional product.

The invention claimed is:

1. A method of processing food elements of plant tissue having a cellular structure with a starch content of greater than 5% w/w, the food elements being tubers, the method comprising arranging the food elements in an aqueous liquid and applying acoustic energy with a selected frequency, energy and time profile to modify the cellular structure of a surface portion of the food elements by removing components from the cellular structure and establishing a surface portion comprising pectin and surrounding a core portion, the surface portion serving as a barrier in a subsequent cooking process, the modified cellular structure providing for a low moisture surface portion relative to the core to be established and maintained and moisture to be retained in the core portion after subsequent cooking processes.

2. The method of claim 1, wherein the acoustic energy is applied for a time period in the range of about 10 seconds to about 30 minutes at a frequency in the range of about 100 Hz to 5 MHz so as to cause a response in the surface portion of the food elements comprising one or more of demethylation of pectin, polymerisation of phenolic compounds, wax synthesis and starch hydrolysis and promoting intercellular cohesion on the surface structure.

3. The method of claim 1, further comprising immersing the food elements in an aqueous bath and applying ultrasonic transducer arrangements with acoustic energy for a time period in the range of about 10 seconds to about 30 minutes at a frequency in the range of 100 Hz to 5 MHz.

4. The method of claim 1, further comprising, subsequent to the application of acoustic energy, blanching the food elements in an aqueous environment at a temperature of about 65° C. to 95° C. for a time in the range of about 1 to 30 minutes, and subsequent to blanching, par-frying followed by freezing.

5. A method of producing potato elements for subsequent deep frying from a frozen stored state comprising:
    establishing the potato elements in an aqueous bath in a raw state;
    applying acoustic energy to modify a surface portion of the potato elements to develop a structure that serves as a barrier in a cooking process and assists in retention of water molecules in a core portion of each potato element;
    blanching the potato elements, before, during or after the step of applying acoustic energy;
    par-frying the potato elements to produce partially cooked potato elements; and
    freezing the partially cooked potato elements.

6. The method of claim 5, further comprising:
    applying acoustic energy for a suitable period and with an energy level and a frequency profile to achieve removal of free sugars, starch and protein and to achieve formation of a barrier-like surface portion around a core.

7. The method of claim 5, wherein the acoustic energy applied to the potato elements has a frequency in the range of 100 Hz to 5 MHz.

8. The method of claim 5, wherein subsequent to the application of acoustic energy, the blanching step is conducted in an aqueous environment at a first temperature of about 65° C. to about 95° C. for a time in the range of about 1 minute to about 30 minutes, and the par-frying step is conducted for about 15 secs to about 4 mins at a second temperature of about 100° C. to about 220° C.

9. The method of claim 1, wherein the acoustic energy applied to the food elements has a frequency in the range of 100 Hz to 5 MHz.

10. The method of claim 1, wherein the acoustic energy has a power intensity in the range of about 0.01 to about 1000 W/cm2.

11. The method of claim 1, wherein the acoustic energy applied to the food elements is provided in the form of ultrasonic energy having at least one of the following frequency components:
   (i) a high frequency component in the range of 170 KHz to 5 MHz;
   (ii) a low frequency component in the range of 100 Hz to 270 KHz.

12. The method of claim 11, wherein the high frequency component is applied at a power of around 25 watts per liter.

13. The method of claim 11, wherein the low frequency component of the ultrasonic energy is applied at one of the following power levels:
   (i) a power of about 50 watts per liter;
   (ii) a power of about 15 watts per liter.

14. A method of processing food elements of plant tissue having a starch content of greater than 5% w/w, the food elements being tubers, the method comprising applying acoustic energy to the food elements prior to any elevated temperature cooking step to modify a surface portion of the food elements so as to develop a structure which can function as a barrier in a cooking process and to assist retention of water molecules in a core portion of each food element.

15. The method of claim 14, wherein the acoustic energy is applied for a time period in the range of about 10 seconds to about 30 minutes at a frequency in the range of about 100 Hz to 5 MHz so as to cause a response in the surface portion of the food elements comprising one or more of demethylation of pectin, polymerisation of phenolic compounds, wax synthesis and starch hydrolysis and promoting intercellular cohesion on the surface structure.

16. The method of claim 14, wherein the food elements are immersed in an aqueous bath to which ultrasonic transducer arrangements are applied with acoustic energy applied in the range of about 10 seconds to about 30 minutes.

17. The method of claim 14, wherein subsequent to the application of acoustic energy, blanching is conducted in an aqueous environment at a temperature of about 65° C. to 95° C. for a time in the range of about 1 to 30 minutes, and subsequent to blanching, par-frying is followed by freezing.

18. The method of claim 14, wherein the acoustic energy applied to the food elements has a frequency in the range of 100 Hz to 5 MHz.

19. The method of claim 14, wherein the acoustic energy has a power intensity in the range from about 0.01 to about 1000 W/cm2.

20. The method of claim 14, wherein the acoustic energy applied to the food elements is provided in the form of ultrasonic energy having at least one of the following frequency components:
   (i) a high frequency component in the range of 170 KHz to 5 MHz;
   (ii) a low frequency component in the range of 100 Hz to 270 KHz.

21. The method of claim 20, wherein the high frequency component is applied at a power of around 25 watts per liter.

22. The method of claim 20, wherein the low frequency component of the ultrasonic energy is applied at one of the following power levels:
   (i) a power of about 50 watts per liter;
   (ii) a power of about 15 watts per liter.

23. The method of claim 5, wherein the process is such that the partially cooked potato elements are suitable for final frying or oven heating from a frozen state and for the final cooking the barrier-like surface portion is adapted to form a crispy surface layer resistant to moisture escaping from the core.

24. The method of claim 5, wherein the acoustic energy has a power intensity in the range from about 0.01 to about 1000 W/cm2.

25. The method of claim 5, wherein the acoustic energy applied to the potato elements is provided in the form of ultrasonic energy having at least one of the following frequency components:
   (i) a high frequency component in the range of 170 KHz to 5 MHz;
   (ii) a low frequency component in the range of 100 Hz to 270 KHz.

26. The method of claim 25, wherein the high frequency component is applied at a power of around 25 watts per liter.

27. The method of claim 25, wherein the low frequency component of the ultrasonic energy is applied at one of the following power levels:
   (i) a power of about 50 watts per liter;
   (ii) a power of about 15 watts per liter.

* * * * *